United States Patent
Yaman et al.

(10) Patent No.: US 10,129,935 B2
(45) Date of Patent: Nov. 13, 2018

(54) WIRELESS KITCHEN APPLIANCE OPERATED ON AN INDUCTION HEATING COOKER

(71) Applicant: Arcelik Anonim Sirketi, Istanbul (TR)

(72) Inventors: Onur Yaman, Istanbul (TR); Ahmet Yorukoglu, Istanbul (TR); Sefa Hazir, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 759 days.

(21) Appl. No.: 14/370,014

(22) PCT Filed: Nov. 26, 2012

(86) PCT No.: PCT/EP2012/073638
§ 371 (c)(1),
(2) Date: Jun. 30, 2014

(87) PCT Pub. No.: WO2013/098016
PCT Pub. Date: Jul. 4, 2013

(65) Prior Publication Data
US 2015/0264751 A1    Sep. 17, 2015

(30) Foreign Application Priority Data
Dec. 29, 2011   (TR) .............................. a 2011 13234

(51) Int. Cl.
*A47J 31/40*    (2006.01)
*A47J 31/047*   (2006.01)
(Continued)

(52) U.S. Cl.
CPC .............. *H05B 6/12* (2013.01); *A47J 27/004* (2013.01); *H05B 6/06* (2013.01); *H05B 6/1236* (2013.01);
(Continued)

(58) Field of Classification Search
None
See application file for complete search history.

(56) References Cited

U.S. PATENT DOCUMENTS 2,133,494 A     10/1938  Waters
3,594,627 A *    7/1971  Lesher .................... H02J 7/022
                                                            320/103
(Continued)

FOREIGN PATENT DOCUMENTS

CN        86201937 U    12/1986
CN       101743777 A     6/2010
(Continued)

OTHER PUBLICATIONS

International search report for PCT application No. PCT/EP2012/073638 and references contained therein.
(Continued)

*Primary Examiner* — Ibrahime A Abraham
*Assistant Examiner* — Gyounghyun Bae
(74) *Attorney, Agent, or Firm* — Kilpatrick Townsend & Stockton LLP

(57) ABSTRACT

The present invention relates to a kitchen appliance (1) that is operated wirelessly on an induction heating cooker (K), comprising a programmable microcontroller (2), one or more than one electronic circuit (3) that provides the microcontroller (2) to control the communication means, user interface and sensors, providing communication with the induction heating cooker (K) whereon the kitchen appliance (1) is operated, a power control circuitry (4) that supplies the microcontroller (2) and the electronic circuits (3) with low level DC voltage, a receiver coil (5) that partially collects and provides transfer of the power generated by the induction coil (B) in the induction heating cooker (K) to the power control circuitry (4), a rectifier (6) that converts the AC voltage delivered from the receiver coil (5) to DC voltage (Continued)

Figure 1:
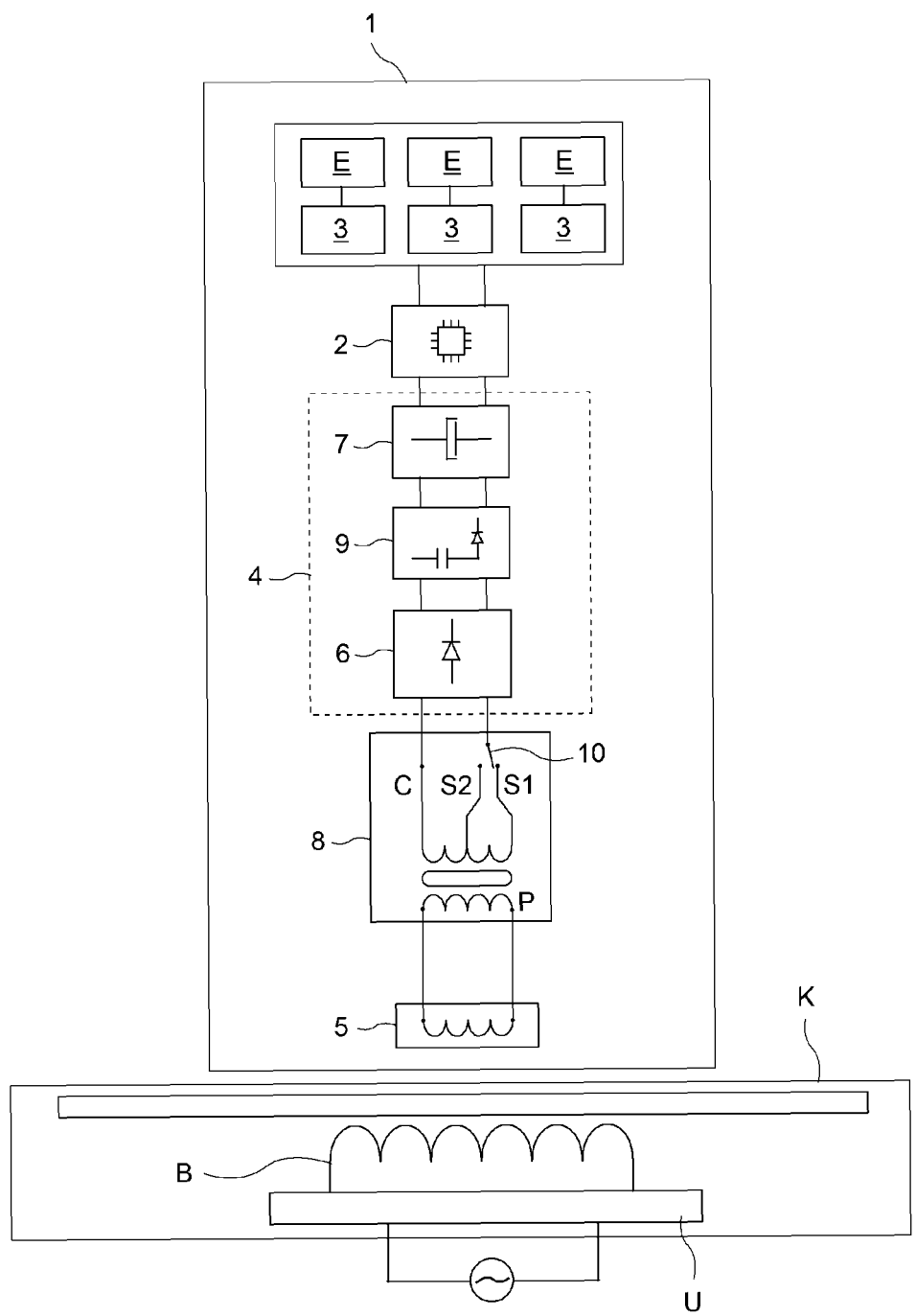

and a buffer capacitor (7) which filters the DC voltage at the rectifier (6) outlet.

22 Claims, 2 Drawing Sheets

(51) Int. Cl.
*H05B 6/04* (2006.01)
*H05B 6/06* (2006.01)
*H05B 6/12* (2006.01)
*A47J 27/00* (2006.01)

(52) U.S. Cl.
CPC ...... *H05B 2206/02* (2013.01); *H05B 2213/06* (2013.01)

(56) References Cited

U.S. PATENT DOCUMENTS

| | | | |
|---|---|---|---|
| 3,742,178 A | 6/1973 | Harnden, Jr. | |
| 3,761,668 A | 9/1973 | Hamden, Jr. et al. | |
| 3,842,338 A | 10/1974 | Walden | |
| 3,889,090 A * | 6/1975 | Mackenzie | H05B 6/062 219/626 |
| 3,953,783 A * | 4/1976 | Peters, Jr. | F24C 7/02 219/663 |
| 3,978,307 A | 8/1976 | Amagami | H02H 7/122 219/620 |
| 4,159,409 A | 6/1979 | Hedberg | |
| 4,555,608 A * | 11/1985 | Mizukawa | H05B 6/062 219/620 |
| 4,716,353 A * | 12/1987 | Engelmann | H02M 3/285 320/139 |
| 4,897,518 A | 1/1990 | Mucha et al. | |
| 4,996,405 A | 2/1991 | Poumey et al. | |
| 5,084,699 A * | 1/1992 | DeMichele | B61L 25/04 336/182 |
| 5,991,170 A | 11/1999 | Nagai et al. | |
| 6,232,585 B1 * | 5/2001 | Clothier | H05B 6/06 126/246 |
| 6,255,635 B1 * | 7/2001 | Thompson | H02M 7/48 219/663 |
| 6,259,259 B1 * | 7/2001 | Raffalt | G01F 23/266 324/118 |
| 6,304,424 B1 | 10/2001 | Mett et al. | |
| 6,316,755 B1 * | 11/2001 | Ulrich | H05B 6/06 219/660 |
| 6,384,387 B1 * | 5/2002 | Owens | A47J 36/2483 219/387 |
| 6,385,056 B1 * | 5/2002 | Gucyski | H02J 9/061 363/15 |
| 6,812,440 B2 | 11/2004 | Hirota et al. | |
| 6,949,915 B2 * | 9/2005 | Stanley | H02M 1/4208 323/207 |
| 7,355,150 B2 | 4/2008 | Baarman et al. | |
| 7,390,994 B2 | 6/2008 | Oh et al. | |
| 7,865,071 B2 | 1/2011 | Baarman | |
| 7,952,322 B2 * | 5/2011 | Partovi | H01F 5/003 320/108 |
| 8,400,017 B2 * | 3/2013 | Kurs | B60L 3/0069 307/104 |
| 8,417,359 B2 | 4/2013 | Tsai et al. | |
| 8,591,403 B2 | 11/2013 | Yoshida et al. | |
| 8,853,892 B2 * | 10/2014 | Fells | H02J 5/005 307/104 |
| 9,318,912 B2 * | 4/2016 | Baarman | H04B 5/0037 |
| 9,356,659 B2 * | 5/2016 | Partovi | H02J 7/025 |
| 9,473,209 B2 | 10/2016 | Cooper et al. | |
| 9,496,732 B2 * | 11/2016 | Partovi | H02J 7/0042 |
| 9,667,084 B2 * | 5/2017 | Pigott | H02J 7/045 |
| 2002/0117497 A1 * | 8/2002 | Bassill | H05B 6/062 219/626 |
| 2005/0067410 A1 | 3/2005 | Ring | |
| 2006/0220592 A1 * | 10/2006 | Barrenscheen | G06F 1/26 315/219 |
| 2007/0012684 A1 | 1/2007 | Liu et al. | |
| 2007/0214967 A1 | 9/2007 | Has et al. | |
| 2007/0215605 A1 | 9/2007 | Baier et al. | |
| 2007/0221068 A1 * | 9/2007 | Boussemart | A47J 27/004 99/279 |
| 2007/0221668 A1 | 9/2007 | Baarman et al. | |
| 2007/0278216 A1 * | 12/2007 | Tominaga | H05B 6/062 219/627 |
| 2008/0037966 A1 | 2/2008 | Baarman | |
| 2008/0223852 A1 | 9/2008 | Bassill et al. | |
| 2009/0001074 A1 | 1/2009 | Shirokawa et al. | |
| 2009/0096413 A1 * | 4/2009 | Partovi | H01F 5/003 320/108 |
| 2009/0129126 A1 * | 5/2009 | Boys | H02J 50/12 363/37 |
| 2010/0007307 A1 * | 1/2010 | Baarman | H02J 7/025 320/108 |
| 2010/0060186 A1 * | 3/2010 | Taipale | H05B 41/2822 315/291 |
| 2010/0116820 A1 | 5/2010 | Pan et al. | |
| 2010/0253234 A1 * | 10/2010 | Hu | H05B 41/2881 315/224 |
| 2010/0288754 A1 | 11/2010 | Ookuma | |
| 2011/0095618 A1 | 4/2011 | Schatz et al. | |
| 2011/0115303 A1 * | 5/2011 | Baarman | H02J 17/00 307/104 |
| 2011/0116823 A1 | 5/2011 | Suda | |
| 2011/0304216 A1 * | 12/2011 | Baarman | H02J 5/005 307/104 |
| 2012/0000903 A1 * | 1/2012 | Baarman | A47J 27/002 219/620 |
| 2012/0068550 A1 | 3/2012 | Boer et al. | |
| 2012/0091794 A1 | 4/2012 | Campanella et al. | |
| 2012/0132647 A1 | 5/2012 | Beverly et al. | |
| 2012/0139356 A1 * | 6/2012 | Jung | H02J 7/025 307/104 |
| 2012/0146576 A1 | 6/2012 | Partovi | |
| 2012/0154260 A1 * | 6/2012 | Decraemer | H05B 33/0815 345/82 |
| 2012/0161534 A1 * | 6/2012 | Urano | H02J 17/00 307/104 |
| 2012/0235566 A1 * | 9/2012 | Karalis | H03H 7/40 315/70 |
| 2012/0248890 A1 * | 10/2012 | Fukushima | H02J 5/005 307/104 |
| 2012/0305545 A1 * | 12/2012 | Brosnan | H05B 6/065 219/622 |
| 2013/0021827 A1 * | 1/2013 | Ye | H03F 1/025 363/17 |
| 2013/0057167 A1 * | 3/2013 | Angeles | H05B 33/0842 315/200 R |
| 2014/0332523 A1 | 11/2014 | Yaman et al. | |
| 2015/0013549 A1 | 1/2015 | Yaman et al. | |

FOREIGN PATENT DOCUMENTS

| | | |
|---|---|---|
| DE | 10319532 A1 | 11/2004 |
| DE | 102006017801 A1 | 11/2007 |
| DE | 102008054904 A1 | 6/2010 |
| EP | 0394148 A1 | 10/1990 |
| EP | 0675671 A2 | 10/1995 |
| EP | 1130752 A2 | 9/2001 |
| EP | 1571889 A1 | 9/2005 |
| EP | 1734789 A1 | 12/2006 |
| JP | S4214520 Y1 | 8/1967 |
| JP | S5033539 B1 | 10/1975 |
| JP | S52136860 A | 11/1977 |
| JP | S5394676 U | 8/1978 |
| JP | S5511653 A | 1/1980 |
| JP | H02299192 A | 12/1990 |
| JP | H05108172 A | 4/1993 |
| JP | H0620766 A | 1/1994 |
| JP | H10165294 A | 6/1998 |
| JP | H1195846 A | 4/1999 |
| JP | H11332135 A | 11/1999 |

(56) References Cited

FOREIGN PATENT DOCUMENTS

| | | | |
|---|---|---|---|
| JP | 2000295774 A | 10/2000 | |
| JP | 2000347747 A | 12/2000 | |
| JP | 2003525518 A | 8/2003 | |
| JP | 2007018422 A | 1/2007 | |
| JP | 2009049880 A | 3/2009 | |
| JP | 2009140892 A | 6/2009 | |
| JP | 2009530584 A | 8/2009 | |
| JP | 2011130474 A | 6/2011 | |
| JP | 2012514495 A | 6/2012 | |
| WO | 9832310 A1 | 7/1998 | |
| WO | 9941950 A2 | 8/1999 | |
| WO | 0165894 A1 | 9/2001 | |
| WO | 0217684 A2 | 2/2002 | |
| WO | 2007088209 A1 | 8/2007 | |
| WO | 2007107888 A2 | 9/2007 | |
| WO | 2007122049 A1 | 11/2007 | |
| WO | 2009037783 A1 | 3/2009 | |
| WO | 2009117929 A1 | 10/2009 | |
| WO | 2010069828 A1 | 6/2010 | |
| WO | 2010080738 A1 | 7/2010 | |
| WO | 2011003301 A1 | 1/2011 | |

OTHER PUBLICATIONS

Written opinion of the international searching authority for PCT application No. PCT/EP2012/073638 and references contained therein.
Final Office Action dated Mar. 17, 2017, of U.S. Appl. No. 14/370,022; 30 pgs.
Non-Final Office Action dated Aug. 30, 2016, of U.S. Appl. No. 14/370,022; 86 pgs.
International search report and written opinion, dated Feb. 21, 2013, of International Application No. PCT/EP2012/076567; 8 pgs.
International search report and written opinion, dated Feb. 12, 2013, of International Application No. PCT/EP2012/074113; 10 pgs.
Non-Final Office Action dated Mar. 29, 2017, of U.S. Appl. No. 14/370,029; 15 pgs.
Final Office Action dated Sep. 11, 2017, of U.S. Appl. No. 14/370,029; 21 pgs.
Non-Final Office Action dated Feb. 22, 2018, of U.S. Appl. No. 14/370,022; 44 pgs.
Non-Final Office Action dated Feb. 27, 2018, of U.S. Appl. No. 14/370,029; 21 pgs.

* cited by examiner

WIRELESS KITCHEN APPLIANCE OPERATED ON AN INDUCTION HEATING COOKER

The present invention relates to a wireless kitchen appliance that is operated on an induction heating cooker.

The use of kitchen appliances that are operated on the induction heating cooker by the principle of wireless power transmission is known. The wireless kitchen appliances are passive heating devices like pots and pans, active heating devices like kettle, coffee machine, toaster or electromechanical devices like mixer, blender that are operated with the electric motor. User interface, sensors and communication means like RFID that provide communication with the induction heating cooker are disposed on the wireless kitchen appliances. Low level electrical power is required for energizing the electronic circuits and the microprocessor that controls these circuits on the wireless kitchen appliance. This electrical power is acquired from the induction coil in the induction heating cooker by means of a low power receiver coil. The microcontroller and the other electronic circuits have to be supplied with an uninterrupted and constant voltage. If the voltage level of the power source that feeds these members is higher or lower than the required voltage, the operation of the microcontroller and the other electronic circuits is interrupted and the wireless kitchen appliance cannot be operated on the induction heating cooker in the desired manner. A ferromagnetic container is placed on the induction heating cooker for normal heating operation and the user can heat the container by means of a knob which is scaled at different power levels, for example between 1 to 9. The present power scale settings used for the ferromagnetic container are also used for the wireless kitchen appliance. If the wireless kitchen appliance is, for example a kettle, the power adjustment of the resistant heater can be made and in an appliance like the mixer with electric motor, the speed of the electric motor is adjusted. When the power scale setting of the induction heating cooker is changed by the user, the electrical voltage supplied to the power source circuitry also changes and the desired continuous and constant voltage cannot be provided. Furthermore, the fluctuations in the mains voltage whereto the induction heating cooker is connected affect the power control circuitry adversely. In the state of the art, power storage elements like battery are used in order to keep the voltage supplied by the power control circuitry constant, however inconveniences arise like requiring a separate structure for running out, changing or charging of the battery. The supercapacitor can also be used instead of the battery but the cost is quite high.

The International Patent Application No. WO9941950 relates to a cooking vessel that is used in induction heating cooktops.

The International Patent Application No. WO2010080738 relates to a smart cookware that is wirelessly operated with an inductive power supply.

The U.S. Pat. No. 7,355,150 relates to a cooking appliance that is energized with non-contact power supply.

The aim of the present invention is the realization of a kitchen appliance that is operated wirelessly on the induction heating cooker and of which the electronic circuits are prevented from being affected by the voltage changes.

The kitchen appliance realized in order to attain the aim of the present invention, explicated in the first claim and the respective claims thereof, is an appliance like cooking container, kettle, coffee machine or mixer that is operated wirelessly on an induction heating cooker. User interface, sensors and communication members that provide communication with the induction heating cooker are disposed in the kitchen appliance. The electronic circuits, switches etc that operate these members are controlled by the microcontroller. The microcontroller and the other electronic circuits are energized by a power control circuitry with low level DC voltage. The kitchen appliance comprises a receiver coil that partially receives the power generated by the induction coil of the induction heating cooker whereon the kitchen appliance is operated and provides transfer to the power control circuitry, a rectifier that converts the AC voltage delivered from the receiver coil to DC voltage, a buffer capacitor and a transformer disposed between the receiver coil and the rectifier, that regulates the voltage transferred to the power control circuitry, thereby providing the power control circuitry to supply the microcontroller and the other electronic circuits with constant value and uninterrupted DC voltage.

In an embodiment of the present invention, the voltage changes in the power control circuitry are detected by means of a peak voltage tracker that is disposed between the rectifier and the buffer capacitor.

In another embodiment of the present invention, the transformer comprises a primary winding, more than one secondary winding and a relay that is controlled by the microcontroller, which activates or deactivates the secondary windings by switching. The microcontroller decreases the number of secondary windings activated by means of the relay if the voltage level detected by the peak voltage tracker is higher than the desired voltage level and increases the number of secondary windings activated if the voltage level detected by the peak voltage tracker is lower.

In another embodiment of the present invention, the transformer comprises a common end double secondary winding.

In another embodiment of the present invention, the microcontroller deactivates the members like LED, display, backlight that draw high power in the kitchen appliance in situations wherein the induction heating cooker is operated at low power settings.

In the kitchen appliance of the present invention, the microcontroller and the other electronic circuits are provided to be supplied with constant and uninterrupted DC voltage. Under conditions wherein the voltage applied from outside to the power control circuitry changes, occurrence of error in the microcontroller and the electronic circuits is prevented, and the microcontroller and the electronic circuits are protected from variable voltage conditions. Elements like battery, supercapacitor are not required in order to keep the voltage level provided by the power control circuitry constant.

The kitchen appliance realized in order to attain the aim of the present invention is illustrated in the attached figures, where:

FIG. 1—is the schematic view of the wireless kitchen appliance operated on an induction heating cooker.

Figure 2:
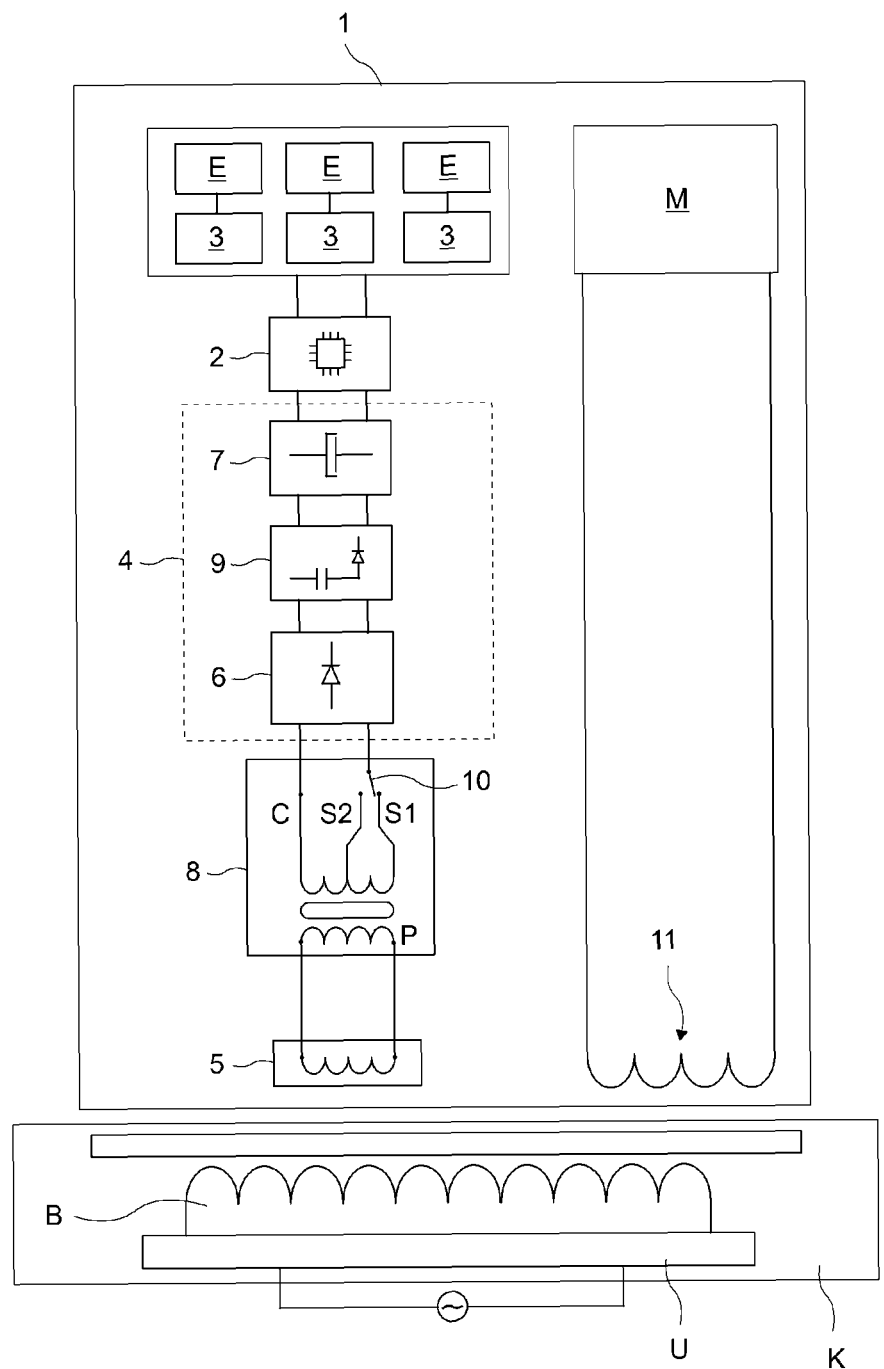

FIG. 2—is the schematic view of the wireless kitchen appliance operated on an induction heating cooker in another embodiment of the present invention.

The elements illustrated in the figures are numbered as follows:
1. Kitchen appliance
2. Microcontroller
3. Electronic circuit
4. Power control circuitry
5. Receiver coil
6. Rectifier
7. Buffer capacitor 8. Transformer
9. Peak voltage tracker
10. Switching means
11. High power receiver coil The kitchen appliance (1) is suitable for being operated wirelessly on an induction heating cooker (K) with the power generated by the induction coil (B). The induction coil (B) situated in the induction heating cooker (K) is operated by a power source unit (U) that drives the induction coil (B) by converting the AC mains voltage to DC voltage as in the state of the art.

The kitchen appliance (1) comprises a programmable microcontroller (2), one or more than one electronic circuit (3) that provides the microcontroller (2) to control the communication and/or control means (E) like RFID, user interface and sensor providing communication with the induction heating cooker (K) whereon the kitchen appliance (1) is operated, a power control circuitry (4) that supplies the microcontroller (2) and the electronic circuits (3) with low level DC voltage, a receiver coil (5) that partially collects and provides transfer of the power generated by the induction coil (B) in the induction heating cooker (K) to the power control circuitry (4), a rectifier (6) disposed in the power control circuitry (4), that converts the AC voltage delivered from the receiver coil (5) to DC voltage and a buffer capacitor (7) which filters the DC voltage at the rectifier (6) outlet.

The kitchen appliance (1) of the present invention comprises a transformer (8) disposed between the receiver coil (5) and the rectifier (6), the operation of which is controlled by the microcontroller (2), that provides the power control circuitry (4) to supply the microcontroller (2) and the electronic circuits (3) with constant value and uninterrupted voltage by compensating the voltage at the outlet of the receiver coil (5) in situations wherein the voltage transferred from the induction coil (B) changes.

In the kitchen appliance (1) of the present invention, when the power scale setting on the induction heating cooker (K) is changed, the voltage level that is transferred from the induction coil (B) to the receiver coil (5) and hence from the receiver coil (5) to the power control circuitry (4) changes. Particularly, if a low power scale is selected, the duty ratio of the induction coil (B) decreases and power is transferred to the receiver coil (5) intermittently and the transferred voltage level falls below the level that can operate the microcontroller (2) and the electronic circuits (3). If a high power scale is selected on the induction heating cooker (K), the duty ratio of the induction coil (B) increases and power is delivered uninterruptedly from the receiver coil (5), however, in this situation, the transferred voltage rises to a level that can damage the microcontroller (2) and the electronic circuits (3). By the transformer (8) being activated by the microcontroller (2) in situations wherein the voltage transferred from the receiver coil (5) changes, if the voltage level is low, it is increased, if high, then decreased, thereby the power control circuitry (4) is provided to supply the microcontroller (2) and the electronic circuits (3) with a constant, uninterrupted and ripple-free DC voltage (for example 5V). The microcontroller (2) is prevented from erasing the data relating to the program being implemented in the kitchen appliance (1) by resetting at any moment under variable voltage conditions and the electronic circuits (3) are provided to operate soundly, protected from fluctuating voltages and prevented from malfunctioning.

In an embodiment of the present invention, the transformer (8) comprises a primary winding (P) and more than one secondary winding (S1, S2) and a switching means (10), for example a relay, controlled by the microcontroller (2), which activates or deactivates one or more than one secondary winding (S1, S2) by switching the secondary windings (S1, S2) depending on the voltage level required to be decreased/increased.

In an embodiment of the present invention, the kitchen appliance (1) comprises a peak voltage tracker (9) that is disposed between the rectifier (6) and the buffer capacitor (7), that tracks the peak values of the voltage at the outlet of the rectifier (6) and feeds back to the microcontroller (2).

The microcontroller (2) provides the activation or deactivation of one or more than one secondary winding (S1, S2) with respect to the voltage level desired to be decreased/increased by actuating the switching means (10) depending on the feedback of the peak voltage tracker (9) in situations of changes in power scale settings, AC mains voltage fluctuations that operate the induction coil (B) and in variable power requirements of the electronic circuits (3).

The microcontroller (2) decreases the number of secondary windings (S1, S2) activated by means of the switching means (10) and provides the voltage at the transformer (8) outlet to decrease if the voltage level detected and fed-back by the peak voltage tracker (9), transferred from the receiver coil (5) is higher than the voltage level whereat the microcontroller (2) and the electronic circuits (3) are kept active.

The microcontroller (2) increases the number of secondary windings (S1, S2) activated by means of the switching means (10) and provides the voltage at the transformer (8) outlet to increase if the voltage level detected and fed-back by the peak voltage tracker (9), transferred from the receiver coil (5) is lower than the voltage level whereat the microcontroller (2) and the electronic circuits (3) are kept active.

In another embodiment of the present invention, the transformer (8) comprises a common end (C) double secondary winding (S1, S2). The microcontroller (2) increases the voltage level by activating the first and second secondary windings (S1, S2) by means of the switching means (10) when the voltage level at the receiver coil (5) outlet decreases and decreases the voltage level by deactivating the first secondary winding (S1) and activating the second secondary winding (S2) by means of the switching means (10) when the voltage increases at the receiver coil (5) outlet.

When the induction heating cooker (K) is operated by the user at low power setting, the durations whereat the induction coil (B), that particularly operates in on/off manner, is "off" are prolonged and in this case it becomes difficult to supply uninterrupted voltage for the microcontroller (2). In situations wherein the induction heating cooker (K) is operated at low power settings and wherein the power stored in the buffer capacitor (7) is not sufficient for supplying the microcontroller (2) with constant voltage level, the members like LED, display, backlight disposed on the kitchen appliance (1) and that draw high power are deactivated by the microcontroller (2), the load of the buffer capacitor (7) is decreased and the microcontroller (2) is provided to be supplied with uninterrupted voltage.

In an embodiment of the present invention, the kitchen appliance (1) is a ferromagnetic cooking container that is heated with the induction energy generated by the induction coil (B).

In another embodiment of the present invention, the kitchen appliance (1) is an active heating appliance, like kettle or toaster, that has a resistant heater.

In another embodiment of the present invention, the kitchen appliance (1) is an electromechanical appliance like mixer, blender or food processor etc that is operated by an electric motor.

In an embodiment of the present invention, the kitchen appliance (1) is an automatic coffee machine and provides cooking control by an infrared sensor and the power control circuitry (4) supplies the electronic circuit (3) and the microcontroller (2) controlling the infrared sensor with uninterrupted and constant voltage by means of the transformer (8).

In another embodiment of the present invention, the kitchen appliance (1) comprises one or more than one high power receiver coil (11) that transfers power from the induction coil (B) for operating members (M) that draw high current like the heater or motor (FIG. 2).

In the kitchen appliance (1) of the present invention, the voltage transferred from the receiver coil (5) to the power control circuitry (4) is compensated by the transformer (8), providing the microcontroller (2) and the electronic circuits (3) to be supplied with constant and uninterrupted voltage. In situations wherein the user changes the power settings of the induction heating cooker (K) and in variable mains voltage conditions, occurrence of error in the microcontroller (2) and the electronic circuits (3) is prevented and the microcontroller (2) and the electronic circuits (3) are protected from variable voltage conditions. High cost and hard to use members like the battery or the supercapacitor are not required for keeping the voltage level supplied by the power control circuitry (4) constant.

It is to be understood that the present invention is not limited by the embodiments disclosed above and a person skilled in the art can easily introduce different embodiments. These should be considered within the scope of the protection postulated by the claims of the present invention.

The invention claimed is:

1. A kitchen appliance, configured to wirelessly operate on an induction heating cooker with a power generated by an induction coil, the kitchen appliance comprising:
   a microcontroller,
   one or more than one electronic circuit that provides a communication and/or control means to be controlled by the microcontroller,
   a power control circuitry that supplies the microcontroller and the one or more than one electronic circuit with a DC voltage for operation of the microcontroller and the one or more than one other electronic circuits,
   a receiver coil positioned across from the induction coil that receives the power generated by the induction coil based on a power scale setting on the inducting heating cooker, and provides transfer of a power to the power control circuitry,
   a rectifier disposed in the power control circuitry that converts AC voltage delivered from the receiver coil to a DC voltage,
   a buffer capacitor which filters the DC voltage at an outlet of the rectifier, and
   a peak voltage tracker that is disposed between the rectifier and the buffer capacitor, that tracks peak values of the DC voltage at the outlet of the rectifier and feeds back to the microcontroller, and
   a transformer disposed between the receiver coil and the rectifier, wherein the transformer is configured to modify, based upon a feedback received from the peak voltage tracker, an amount of AC voltage delivered to the rectifier to keep an amount of DC voltage provided to the microcontroller and the one or more than one electronic circuits constant.

2. A kitchen appliance as in claim 1, characterized by the transformer comprising a primary winding and more than one secondary winding and a switching means controlled by the microcontroller, which activates or deactivates one or more than one secondary winding by switching the secondary windings, such that the one or more than one secondary winding is electrically coupled to the rectifier based on a state of the switching means.

3. A kitchen appliance as in claim 2, characterized by the microcontroller, that activates or deactivates one or more than one secondary winding by actuating the switching means depending on the feedback received from the peak voltage tracker.

4. A kitchen appliance as in claim 3, characterized by the transformer comprising a common end double secondary winding.

5. A kitchen appliance as in claim 4, characterized by the microcontroller that deactivates members like LED, display, backlight which draw high power in situations whereat the induction heating cooker is operated at low power settings.

6. A kitchen appliance as in claim 5, characterized by being a ferromagnetic cooking container that is heated by the induction energy generated by the induction coil.

7. A kitchen appliance as in claim 5, characterized by being an active heating appliance having a resistant heater.

8. A kitchen appliance as in claim 5, characterized by being an electromechanical appliance that is operated by an electric motor.

9. A kitchen appliance as in claim 5, characterized by being a coffee machine wherein a cooking control is provided by means of an infrared sensor.

10. A kitchen appliance as in claim 9, characterized by one or more than one high power receiver coil that transfers power from the induction coil for operating members like heater or motor.

11. A kitchen appliance as in claim 3, wherein the microcontroller decreases a number of secondary windings activated, by means of a relay, if a voltage level detected by the peak voltage tracker is higher than a desired voltage level and increases the number of secondary windings activated if the voltage level detected by the peak voltage tracker is lower than the desired voltage level.

12. A kitchen appliance as in claim 1, characterized by the microcontroller that deactivates the members like LED, display, backlight which draw high power in situations whereat the induction heating cooker is operated at low power settings.

13. A kitchen appliance as in claim 1, characterized by being a ferromagnetic cooking container that is heated by the induction energy generated by the induction coil.

14. A kitchen appliance as in claim 1, characterized by being an active heating appliance having a resistant heater.

15. A kitchen appliance as in claim 1, characterized by being an electromechanical appliance that is operated by an electric motor.

16. A kitchen appliance as in claim 1, characterized by being a coffee machine wherein a cooking control is provided by means of an infrared sensor.

17. A kitchen appliance as in claim 1, characterized by one or more than one high power receiver coil that transfers power from the induction coil for operating members like heater or motor.

18. A kitchen appliance as in claim 1, wherein if a low power scale of the kitchen appliance is selected, power is transferred intermittently from the induction coil to the receiver coil, and if a high power scale is selected, the power transferred from the induction coil to the receiver coil is delivered to the receiver coil uninterruptedly.

19. A kitchen appliance as in claim 1, wherein the transformer includes a switch, and wherein the switch is controlled by the microcontroller.

20. A kitchen appliance as in claim 19, wherein the switch is a relay.

21. A kitchen appliance as in claim 1, wherein the transformer includes a common end.

22. A kitchen appliance, configured to wirelessly operate on an induction heating cooker with a power generated by an induction coil, the kitchen appliance comprising:
   a microcontroller,
   one or more than one electronic circuit that provides a communication and/or control means to be controlled by the microcontroller,
   a power control circuitry that supplies the microcontroller and the one or more than one electronic circuit with a DC voltage for operation of the microcontroller and the one or more than one other electronic circuits,
   a receiver coil positioned across from the induction coil that receives the power generated by the induction coil based on a power scale setting on the inducting heating cooker, and provides transfer of a power to the power control circuitry,
   a rectifier disposed in the power control circuitry that converts AC voltage delivered from the receiver coil to a DC voltage,
   a buffer capacitor which filters the DC voltage at an outlet of the rectifier,
   a peak voltage tracker that is disposed between the rectifier coil and the buffer capacitor, wherein the peak voltage tracker tracks peak values of the DC voltage at the outlet of the rectifier and feeds back to the microcontroller, and
   a transformer disposed between the receiver coil and the rectifier, the transformer providing the power control circuitry to supply the microcontroller and the electronic circuits with constant DC voltage by compensating the AC voltage at the outlet of the receiver coil, wherein the transformer includes a switch to adjust the AC voltage, and wherein the AC voltage is adjusted based upon a feedback from the peak voltage tracker to keep an amount of DC voltage constant.

* * * * *